United States Patent
Staudacher et al.

[15] 3,703,192
[45] Nov. 21, 1972

[54] ALARM AND SAFEGUARD SYSTEM FOR A CONTROLLED ENVIRONMENT BOX

[72] Inventors: Gerald R. Staudacher, Bay City; Sidney W. Ames, Midland, both of Mich.

[73] Assignee: The Dow Chemical Company, Midland, Mich.

[22] Filed: Jan. 29, 1971

[21] Appl. No.: 110,805

[52] U.S. Cl. .......................137/554, 23/281, 55/274
[51] Int. Cl.....G04c 23/00, G05b 19/00, C06b 21/02
[58] Field of Search .137/554, 557; 23/281; 317/142; 340/213; 55/274

[56] References Cited

UNITED STATES PATENTS 3,474,823   10/1969   Finlayson et al...........137/554

Primary Examiner—Henry T. Klinksiek
Attorney—Griswold & Burdick, V. Dean Clausen and Lloyd S. Jowanovitz

[57] ABSTRACT

An alarm and safeguard system is disclosed which is particularly adapted for use with an automatically operated, controlled environment box, usually referred to as a "dry box." A manometer partly filled with mercury is in direct communication with the dry box and is electrically connected to a power source and to an electromagnetic relay. If the pressure in the dry box atmosphere drops below or rises above a preset safe operating level, the mercury in the manometer will contact one of the electrical connections to the relay and thereby energize the relay. Energizing of the relay completes a circuit through an alarm system comprising a buzzer and a light. Activation of the buzzer and the light thereby provides both an audible and a visible signal which draws attention to the abnormal pressure condition in the box.

5 Claims, 1 Drawing Figure

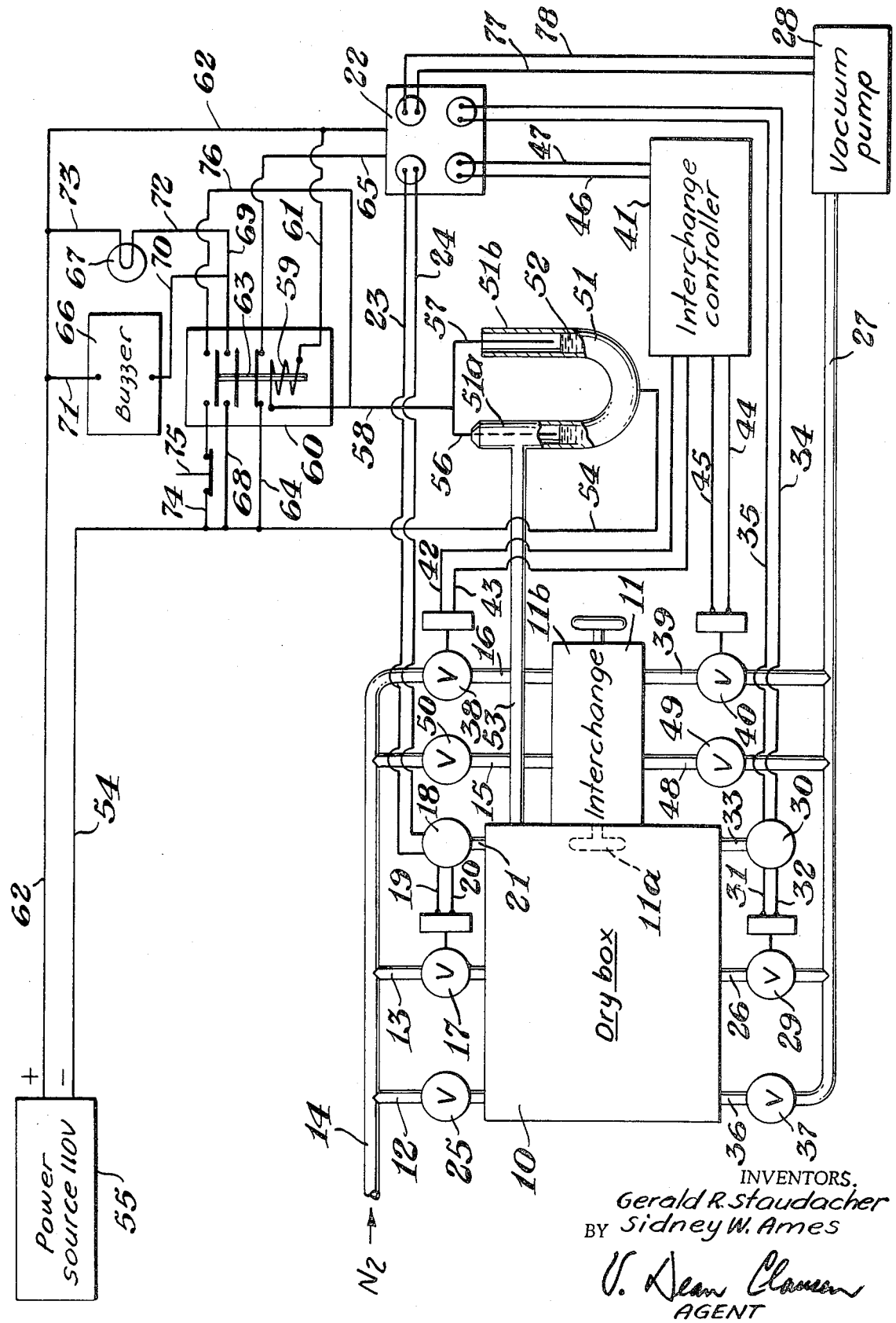

ALARM AND SAFEGUARD SYSTEM FOR A CONTROLLED ENVIRONMENT BOX

BACKGROUND OF THE INVENTION

The invention relates broadly to controlled environment boxes. More particularly, the invention covers an alarm and safeguard system for controlled environment boxes, particularly automatically operated boxes, wherein an abnormal pressure condition in the box will activate an audible and visible warning alarm.

A controlled environment box, which may also be referred to as a dry box, inert atmosphere box, or glove box, is usually employed for the reaction or storing of materials which require a substantially dry environment, i.e., an environment relatively free of oxygen and moisture. A typical example of the use of a controlled environment box is in the preparation of pyrophoric compounds, such as certain metal hydrides, which will spontaneously ignite if exposed to oxygen and moisture present in the surrounding atmosphere. To provide a suitable environment for preparing the hydride compounds, the atmosphere in the closed box usually comprises a relatively chemically inert gas, such as nitrogen, which is substantially free of oxygen and moisture.

For most operations the pressure of the inert gas atmosphere in the closed box is usually maintained at about the level of the surrounding atmosphere. To maintain the box pressure at the desired operating level, the flow of inert gas into and out of the box is preferably regulated by an automatic electro-mechanical system which utilizes solenoid valves, pressure switches, and the like. For various reasons, however, such as a malfunction or failure in the equipment, an operator error, or the like, the inert atmosphere pressure in the box may drop below or rise above a "safe" operating level. The obvious undesirable result is a condition of "underpressure" or "overpressure," which may cause the box to implode or explode and thereby expose the contents of the box to the atmosphere. Another disadvantage is that a substantial amount of "down" time and labor time is usually required to repair or replace damaged equipment.

SUMMARY OF THE INVENTION

A principal object of the present invention is to provide a controlled environment box incorporating an automatic alarm system which will give an immediate indication of an abnormal pressure condition in the box atmosphere.

Another object is to provide an automatic alarm system of the type described which will instantly shut down all electrical power to the box systems to prevent continued operation of the box until the malfunction has been corrected.

Still another object is to provide an alarm system of the type described which incorporates both an audible signal and a visible signal to indicate that an abnormal pressure condition exists in the box atmosphere.

The alarm and safeguard system of this invention includes a main electrical power source, which is electrically connected into a power outlet. The power outlet, in turn, supplies power to a valve means for controlling inert gas flow into and out of the box and to an interchange chamber associated with the box. A pressure sensing device communicates with the environment box and is electrically connected into the main power source and into a relay. The relay, in turn, is connected into the main power source and into an alarm system. When the pressure of the inert atmosphere in the box assumes a level which is higher or lower than a pre-set safe operating level, the pressure sensing device actuates the relay. In actuating the relay, the circuit to the power outlet is interrupted and a circuit through the alarm system is completed, to thereby activate the alarm system.

BRIEF DESCRIPTION OF THE DRAWING

The single FIGURE of the drawing is a schematic view of a controlled environment box, which includes an alarm and safeguard system, according to one embodiment of the invention.

DESCRIPTION OF THE PREFERRED EMBODIMENT

Referring to the drawing, the numeral 10 designates generally a controlled environment box. Mounted at one end of the box 10 is an interchange chamber 11. Chamber 11 is usually a cylindrical chamber with an inner door 11a which opens into the box 10 and an outer door 11b, which opens to the surrounding atmosphere. Both of the doors are hingeably mounted on chamber 11 and each door operates independently of the other. Each door is equipped with a wheel-type latch or other suitable latch mechanism to form an airtight seal when the door is closed. The purpose of chamber 11 is to provide an air-tight chamber through which materials can be moved into and out of box 10.

Communicating with environment box 10 are branch lines 12 and 13, each of which connect into a main line 14. Also branching off from main line 14 are lines 15 and 16, which communicate with interchange chamber 11. The opposite end of main line 14 connects into a source of inert gas, such as nitrogen (not shown). In the automatic operation of box 10 the flow of inert gas into the box is preferably regulated by a solenoid valve 17 in line 13. The solenoid valve 17 is opened and closed by a pressure switch 18, which is electrically connected to valve 17 through leads 19 and 20. Switch 18 also communicates directly with the environment box 10 through tube 21 and the switch is electrically connected to a power outlet panel 22 through leads 23 and 24. A conventional bellows-actuated microswitch, of the type sold under the name Meletron, is preferred.

In certain instances, such as where a malfunction may occur in solenoid valve 17 or pressure switch 18, the flow of inert gas into box 10 may be regulated manually by a valve 25 in branch line 12. Again referring to the automatic operation of box 10, the inert gas flows out of the box through a branch line 26, which connects the box with a main line 27. The opposite end of main line 27 connects into a vacuum pump 28, the pump being electrically connected to the power outlet panel 22 by leads 77 and 78. A solenoid valve 29 in line 26 automatically regulates the outflowing gas, the valve being controlled by pressure switch 30, which is electrically connected to the valve by leads 31 and 32.

Switch 30 also communicates with box 10 through tube 33 and is electrically connected to power panel 22 through leads 34 and 35. Pressure switch 30 is preferably a bellows-actuated micro-switch of the same type as switch 18, described above. A branch line 36 also communicates with box 10 and connects into main line 27. If a malfunction should occur in solenoid valve 29 or pressure switch 30, the outflow of gas from box 10 may be directed through line 36 and controlled by a manually operated valve 37 in line 36.

Evacuation of purge gas from interchange chamber 11, by vacuum pump 28, is through branch line 39, which communicates with chamber 11 and connects into main line 27. A solenoid valve 40 in line 39 automatically regulates the gas being evacuated from chamber 11. The flow of inert gas into interchange chamber 11, during purging of the chamber, is automatically regulated by a solenoid valve 38 in branch line 16. Both of the solenoid valves 38 and 40 are opened and closed automatically by an interchange controller 41, which controls the evacuation and purge sequence. Electrical leads 42, 43, connect solenoid valve 38 to the controller 41 and leads 44, 45, connect solenoid valve 40 to the controller.

Electrical power to the interchange controller 41 is supplied from power outlet 22 through leads 46 and 47, which connect the controller to the power outlet. To simplify the present disclosure, the construction and operation of controller 41 are not described herein. However, a typical controller unit which may be used in the evacuation and purging of interchange chamber 11 is specifically described in U.S. Pat. No. 3,474,823, to Finlayson and Doan.

If a malfunction should occur in the controller 41, the evacuation and purging of interchange chamber 11 with inert gas may be done manually. In a manual evacuation, the inert gas is drawn out of chamber 11 through branch line 48, which connects chamber 11 with main line 27. The outflowing gas is regulated by a manually operated valve 49 in line 48. To manually purge interchange chamber 11, the purge gas is directed into the chamber through branch line 15, with the gas flow being regulated by a manually operated valve 50.

A manometer 51 provides a device for sensing a deviation in the pre-set pressure level of the inert gas atmosphere in environment box 10. Basically, manometer 51 comprises a U-shaped glass tube having a closed left leg 51a and an open right leg 51b, the legs being partly filled with mercury 52. The manometer communicates with environment box 10 through a tube 53, which connects the box with closed leg 51a. A main electrical lead 54 connects the manometer with a main power source 55.

A first sensing wire 56 is encased in closed leg 51a of manometer 51. Wire 56 is positioned in leg 51a so that the lower end of the wire will not contact the mercury 52 until the inert gas pressure in box 10 drops below a pre-set level. A second sensing wire 57, which is inserted in open leg 51b of manometer 51, is positioned such that the lower end of the wire will remain out of contact with mercury 52 until the inert gas pressure in box 10 rises above the pre-set level. Both of the sensing wires 56 and 57 are connected through a common lead 58 into one side of a coil 59 in a relay 60. The opposite side of coil 59 is connected by a lead 61 into a main power lead 62. The main lead 62, in turn, connects the main power source 55 with power outlet 22.

Relay 60 is an electromagnetic relay of the type generally referred to as an alarm relay, which includes a holding circuit. More specifically, the relay 60 is a three-pole, double throw relay, which has one circuit normally closed and two circuits normally open. Any of the commercially available three-pole, double throw relays, of the type described above, and which include a holding circuit, may be used. Basic components of relay 60 are a magnet coil 59 and a three-pole armature 63. As shown in the drawing, the relay is de-energized and is, therefore, in the normally open position. In the normally open position of the relay, a power circuit is completed from main power source 55 through main lead 54, branch lead 64, and through lead 65 into power outlet 22.

When the inert atmosphere pressure in environment box 10 is at a "normal" level, relay 60 will remain in normally open position. In the normally open position, the power circuit will remain closed and the other two circuits in the relay, which comprise an alarm circuit and a holding circuit will remain open. The alarm system comprises a buzzer 66, as an audible signal, and a light bulb 67, as a visible signal. One side of the audible alarm circuit is provided by branch lead 68, which connects relay 60 into main lead 54. The other side of the audible circuit is through common lead 69 and branch lead 70, which connect the relay to buzzer 66, and through branch lead 71, which connects the buzzer into main lead 62. One side of the visible alarm circuit is through common lead 69 and branch lead 72, which connect light 67 to relay 60. The opposite side of the circuit is through branch lead 73, which connects light 67 into main lead 62.

One side of the holding circuit is provided by a branch lead 74, which connects relay 60 into main lead 54, through a re-set switch 75. The opposite side of the holding circuit is through a lead 76, which connects relay 60 into common lead 58. When the inert atmosphere pressure in environment box 10 deviates from the pre-set "normal" condition, as explained more fully hereinafter, the armature 63 in relay 60 will move from the normally open to the closed position. When armature 63 moves to the closed position, it breaks the power circuit and simultaneously closes both the alarm and holding circuits.

In a typical operation of environment box 10, the pressure of the inert gas atmosphere is kept at about normal atmospheric pressure for safe operation. To maintain the box pressure at a safe level, the low pressure switch 18 is set for actuation at a minimum pressure level. Conversely, the high pressure switch 30 is set for actuation at a maximum pressure level. If the pressure in box 10 drops below the minimum setting, the bellows-actuated pressure switch 18 will open solenoid valve 17, which allows nitrogen gas to flow into box 10 through branch line 13. As soon as the gas pressure in box 10 rises above the minimum setting, i.e., it comes up to the normal pre-set pressure, switch 18 will close valve 17, which allows the box to continue to operate at a safe pressure level. Conversely, if the pressure in box 10 rises above the maximum level, the pressure switch 30 will open solenoid valve 29. As valve 29 opens, the vacuum pump 28, which runs continuously, will draw inert gas out of box 10, through lines 26 and 27, until the box pressure drops back to a safe operating level.

To illustrate the practice of the invention, assume that a malfunction or failure occurs in high pressure switch 30, while solenoid valve 29 is open. Such a condition can occur, for example, if dirt or other foreign matter should get into the valve mechanism. If the failure should occur when the operator is not present to correct the problem, the vacuum pump 28 will continue to run and therefore continuously withdraw inert gas from box 10. In this situation, the box pressure will drop below the minimum safe level in a very short time and may cause the box to implode.

The alarm and safeguard system of this invention will prevent the hazardous "underpressure" condition described above. For example, as the pressure in box 10 begins to drop below the normal pre-set level, the level of the mercury 52 in leg 51a of the manometer will rise, due to the partial vacuum which is created in the closed space above the mercury. Since the lower end of sensing wire 56 is positioned immediately above the "normal" level of the mercury in leg 51a, the mercury will contact the wire before the inert atmosphere in box 10 drops below the unsafe pre-set level. When the mercury 52 contacts wire 56, a circuit is completed from power source 55, through manometer 51, and into relay 60.

As the circuit is completed from manometer 51 to relay 60, the armature 63 will move from the normally open position to the closed position, thereby breaking the power circuit which feeds into power outlet 22. Breaking of the power circuit immediately shuts down all of the automatic systems which control the operation of box 10, i.e., the solenoid valves, pressure switches, the interchange controller and the vacuum pump. At the same time that the power circuit is broken, the alarm circuit and holding circuit will be closed, thereby actuating buzzer 66 and light 67 to provide both an audible and a visible warning signal.

The purpose of the holding circuit, therefore, is to keep the alarm circuit alive, so that buzzer 66 and light 67 will continue to emit a signal even if the mercury in manometer 51 is no longer in contact with the sensing wire 56. This assures that the operator's attention will be attracted to the malfunction which originally created the abnormal pressure condition in box 10. A situation could occur, for example, in which the pressure in box 10 may temporarily return to a normal condition, i.e., within the minimum and maximum settings of pressure switches 18 and 30. This pressure condition would allow the mercury 52 to break contact with sensing wire 56. In the situation as described, if the relay 60 did not include a holding circuit, the relay would de-energize and thus close the power circuit. Once the malfunction in the box system has been corrected, however, and the holding circuit is no longer required, the relay 60 may be de-energized by pushing re-set switch 75.

It will be apparent from the above description of the alarm and safeguard system of this invention, that the system will also provide warning of an unsafe "overpressure" condition in the environment box 10. For example, if the pressure in box 10 rises above the maximum pre-set level, the excess pressure will force the mercury 52 in manometer 51 up into leg 51b. When the mercury in leg 51b contacts sensing wire 57, a circuit will be completed from manometer 51 to relay 60, thereby energizing the relay to break the power circuit and simultaneously close the alarm and holding circuits.

What is claimed is:

1. An alarm and safeguard system for a controlled environment box which includes, in combination:
    a. a main electrical power source;
    b. a power outlet which is electrically connected to the main power source, to a valve means for controlling inert gas flow into the environment box, to a valve means for controlling inert gas flow out of the environment box, and to an electrical system which controls an interchange chamber associated with the environment box;
    c. a pressure sensing means which communicates with the environment box, is electrically connected to the main power source, and is adapted to sense a pressure condition in the environment box which does not correspond to a pre-set pressure condition;
    d. a relay means which is electrically connected to the pressure indicating means and to the power outlet;
    e. an alarm system which is electrically connected to the relay and to the main power source;
    whereby, when the pressure in the environment box assumes a level other than the said pre-set pressure condition, the pressure sensing means will actuate the relay, thereby interrupting the circuit to the power outlet and completing a circuit through the alarm system, thus activating the said alarm system.

2. An alarm and safeguard system for a controlled environment box which includes, in combination:
    a. a main electrical power source and a power outlet which connects into the said main source;
    b. a gas inlet line in communication with the environment box and a source of inert gas;
    c. a gas outlet line in communication with the environment box and a vacuum pump, the pump being electrically connected to the power outlet;
    d. a first solenoid valve located in the gas inlet line and a second solenoid valve located in the gas outlet line;
    e. a first pressure switch which communicates with the environment box and is electrically connected to the first solenoid valve and the power outlet, for controlling inert gas flow into the environment box;
    f. a second pressure switch which communicates with the environment box and is electrically connected to the second solenoid valve and the power outlet, for controlling inert gas flow out of the environment box;
    g. an interchange chamber in communication with the environment box;
    h. an electrical control system connected to the interchange chamber and to the power outlet, for controlling evacuation and purging of the interchange chamber;
    i. a manometer in communication with the environment box and which is electrically connected to the main power source;
    j. an electrical relay which is connected to the main power source and the power outlet;

k. a first electrical sensing means, which is associated with the manometer and is connected to the relay, for indicating a pressure condition in the environment box which does not correspond to a pre-set pressure condition;
l. a second electrical sensing means which is associated with the manometer and is connected to the relay, for indicating a pressure condition in the environment box which does not correspond to the said pre-set pressure condition;
m. an alarm system which includes an audible signal and a visible signal, the said audible and visible signals being connected to the relay and to the main power source;

whereby, when the pressure in the environment box assumes a level other than the said pre-set pressure condition, at least one of the said sensing means will actuate the relay, thereby interrupting the circuit to the power outlet and completing a circuit through the alarm system, thus activating the said audible and visible signals.

3. The alarm system of claim 2 in which:
a. the manometer is a U-shaped manometer having one closed leg and one leg open to the outside atmosphere;
b. each leg of the manometer is partially filled with mercury;
c. a first sensing wire is encased in the closed leg of the manometer and positioned such that the mercury in said leg will contact the sensing wire and thus actuate the relay if the pressure in the environment box falls below the pre-set level;
d. a second sensing wire is encased in the open leg of the manometer and positioned such that the mercury in said leg will contact the sensing wire and thus actuate the relay if the pressure in the environment box rises above the pre-set level.

4. The alarm system of claim 2 in which the audible signal is an electric buzzer.

5. The alarm system of claim 2 in which the visible signal is an electric light.

* * * * *